US00RE47664E

(19) United States
(12) Reissued Patent
Andre et al.

(10) Patent Number: US RE47,664 E
(45) Date of Reissued Patent: Oct. 29, 2019

(54) COMPUTING DEVICE

(71) Applicant: Apple Inc., Cupertino, CA (US)

(72) Inventors: Bartley K. Andre, Palo Alto, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steven P. Jobs, Palo Alto, CA (US); Duncan Robert Kerr, San Francisco, CA (US); Shin Nishibori, Kailua, HI (US); Matthew Dean Rohrbach, San Francisco, CA (US); Douglas B. Satzger, Menlo Park, CA (US); Calvin Q. Seid, Palo Alto, CA (US); Christopher J. Stringer, Woodside, CA (US); Eugene Antony Whang, San Francisco, CA (US); Rico Zörkendörfer, San Francisco, CA (US)

(73) Assignee: Apple Inc., Cupertino, CA (US)

(21) Appl. No.: 29/622,909

(22) Filed: Oct. 20, 2017

Related U.S. Patent Documents

Reissue of:
(64) Patent No.: Des. 741,316
Issued: Oct. 20, 2015
Appl. No.: 29/489,648
Filed: May 1, 2014

U.S. Applications:
(63) Continuation of application No. 29/412,855, filed on Feb. 8, 2012, now Pat. No. Des. 708,174, which is a
(Continued)

(51) LOC (12) Cl. ..... 14-02
(52) U.S. Cl.
USPC ..... D14/315
(58) Field of Classification Search
USPC ..... D14/315–327; D18/1, 2, 7, 11
(Continued)

(56) References Cited

U.S. PATENT DOCUMENTS

D416,238 S 11/1999 Irie et al. ..... D14/318
6,067,224 A 5/2000 Nobuchi ..... G06F 1/1616 361/679.21

(Continued)

OTHER PUBLICATIONS

Apple PowerBook G4 Titanium, available at least as early as Jan. 1, 2001.

(Continued)

*Primary Examiner* — Darlington Ly
(74) *Attorney, Agent, or Firm* — Saidman DesignLaw Group, LLC

(57) CLAIM

The ornamental design for a computing device, as shown and described.

DESCRIPTION

*This application is for reissue of U.S. Pat. No. D741,316, which issued from application Ser. No. 29/489,648, which is a continuation of prior pending application Ser. No. 29/412,855, filed Feb. 8, 2012, which is a continuation of Ser. No. 29/400,286, filed Aug. 25, 2011, now U.S. Pat. No. D655,703, which is a continuation of Ser. No. 29/391,635, filed May 11, 2011, now U.S. Pat. No. D645,860, which is a continuation of Ser. No. 29/365,032, filed Jul. 1, 2010, now U.S. Pat. No. D639,295, which is a continuation of Ser. No. 29/354,258, filed Jan. 21, 2010, now U.S. Pat. No. D621,409, which is a continuation of Ser. No. 29/321,731, filed Jul. 22, 2008, now U.S. Pat. No. D612,844, which is a continuation of Ser. No. 29/296,887, filed Oct. 30, 2007, now U.S. Pat. No. D574,378, which is a continuation of Ser. No. 29/259,461 filed May 8, 2006, now U.S. Pat. No. D558,753, the entirety of which are expressly incorporated herein by reference.*

[FIG. 1 is a perspective view of a computing device showing our new design;]

(Continued)

(NEW)

[FIG. 2 is a top view thereof; and,]
[FIG. 3 is a front view thereof, showing the computing device in a closed position.]
*FIG. 4 is a perspective view of a computing device showing our new design;*
*FIG. 5 is a top plan view thereof;*
*FIG. 6 is a side elevation view thereof;*
*FIG. 7 is a front elevation view thereof; and,*
*FIG. 8 is a rear elevation view thereof.*
The broken lines illustrate [environmental structure] *portions of the computing device* which [forms] *form* no part of the claimed design.

1 Claim, 8 Drawing Sheets

Figure 1:
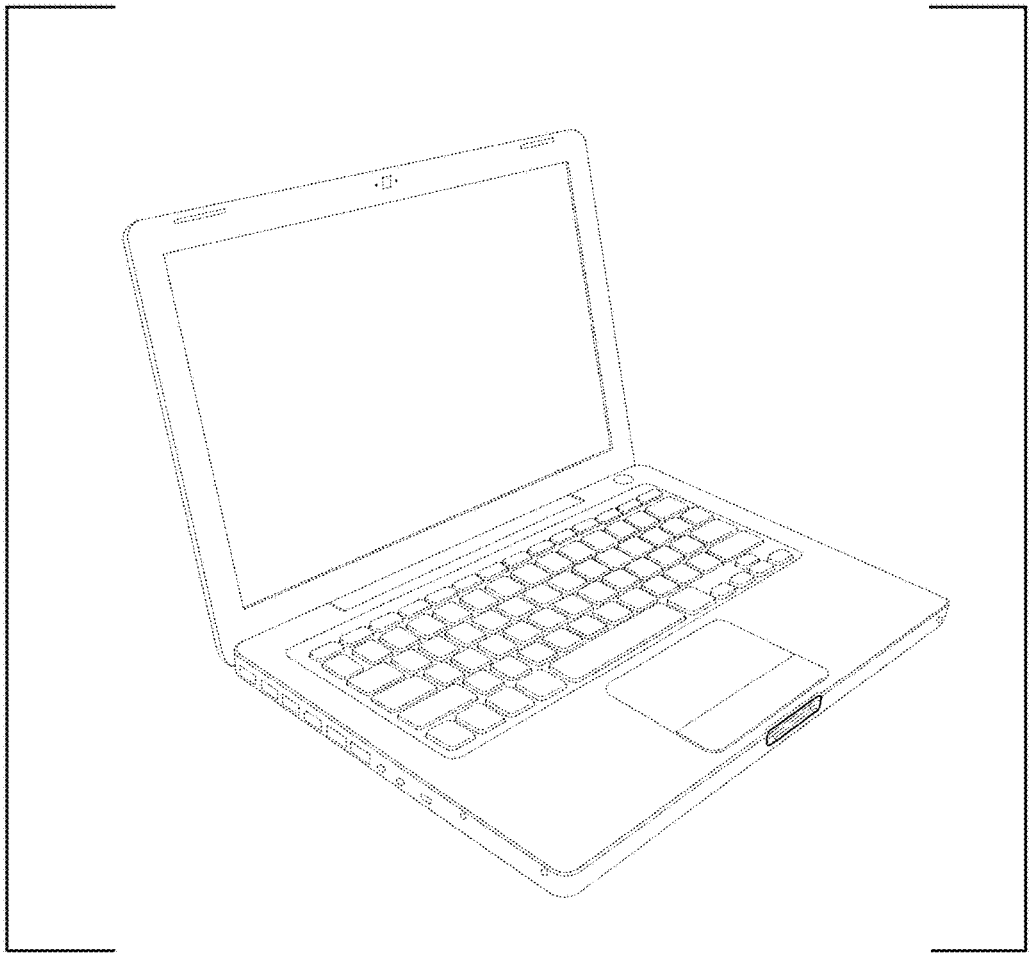
Figure 2:
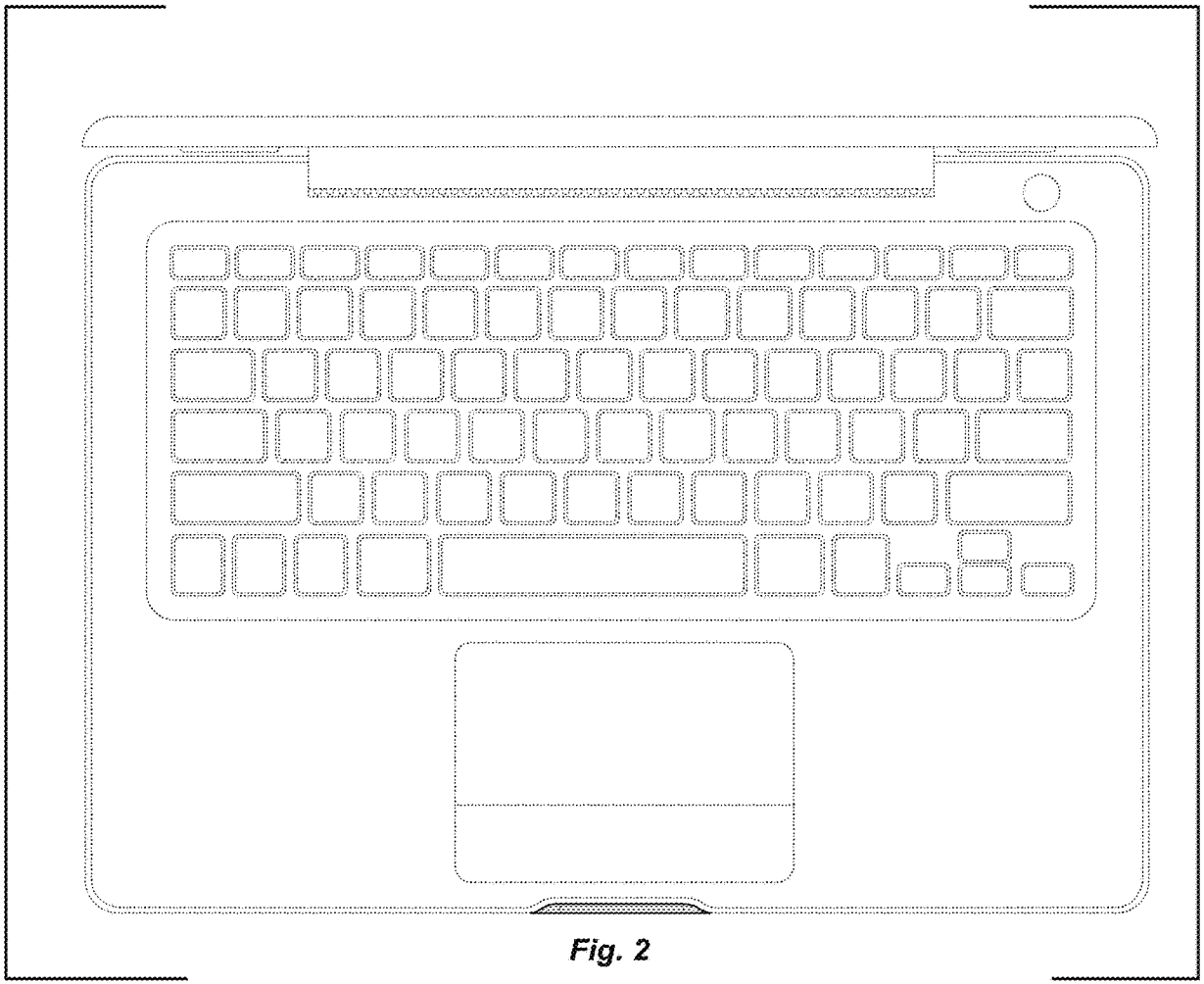
Figure 3:
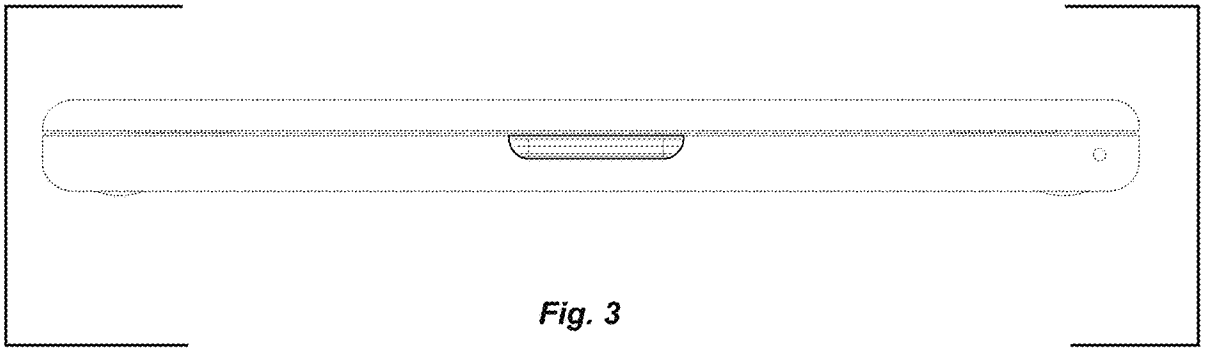

Matter enclosed in heavy brackets [ ] appears in the original patent but forms no part of this reissue; matter printed in italics indicates the additions made by reissue.

Related U.S. Application Data continuation of application No. 29/400,286, filed on Aug. 25, 2011, now Pat. No. Des. 655,703, which is a continuation of application No. 29/391,635, filed on May 11, 2011, now Pat. No. Des. 645,860, which is a continuation of application No. 29/365,032, filed on Jul. 1, 2010, now Pat. No. Des. 639,295, which is a continuation of application No. 29/354,258, filed on Jan. 21, 2010, now Pat. No. Des. 621,409, which is a continuation of application No. 29/321,731, filed on Jul. 22, 2008, now Pat. No. Des. 612,844, which is a continuation of application No. 29/296,887, filed on Oct. 30, 2007, now Pat. No. Des. 574,378, which is a continuation of application No. 29/259,461, filed on May 8, 2006, now Pat. No. Des. 558,753.

(58) Field of Classification Search
CPC ..... G06F 1/16; G06F 1/1616; G09B 13/04; H01R 35/02; H03K 17/94; H03M 11/00
See application file for complete search history.

(56) References Cited

U.S. PATENT DOCUMENTS

| | | | | |
|---|---|---|---|---|
| 6,166,737 | A | 12/2000 | Lee et al. | G06F 1/1616 345/168 |
| D463,797 | S | 10/2002 | Andre et al. | D14/327 |
| 6,657,854 | B2 | 12/2003 | Horii et al. | G06F 1/1616 361/679.09 |
| D491,177 | S | 6/2004 | Andre et al. | D14/318 |
| D493,785 | S | 8/2004 | Andre et al. | D14/318 |
| 6,771,494 | B2 * | 8/2004 | Shimano | G06F 1/1616 345/173 |
| D513,509 | S | 1/2006 | Kawa | D14/318 |
| 7,035,665 | B2 | 4/2006 | Kido et al. | G06F 1/1616 379/433.13 |
| D527,730 | S | 9/2006 | Dong | D14/315 |
| D529,907 | S | 10/2006 | Dong | D14/315 |
| D547,310 | S | 7/2007 | Yoon | D14/315 |
| D556,192 | S | 11/2007 | Jeong | D14/327 |
| D558,752 | S | 1/2008 | Andre et al. | D14/315 |
| D558,753 | S | 1/2008 | Andre et al. | D14/315 |
| D571,364 | S | 6/2008 | Andre et al. | D14/315 |
| D572,247 | S | 7/2008 | Andre et al. | D14/315 |
| D574,378 | S | 8/2008 | Andre et al. | D14/315 |
| D589,507 | S | 3/2009 | Andre et al. | D14/315 |
| D604,294 | S | 11/2009 | Andre et al. | D14/318 |
| D611,469 | S | 3/2010 | Andre et al. | D14/315 |
| D616,881 | S | 6/2010 | Andre et al. | D14/318 |
| D625,717 | S | 10/2010 | Andre et al. | D14/318 |
| D633,087 | S | 2/2011 | Andre et al. | D14/315 |
| D635,566 | S | 4/2011 | Andre et al. | D14/318 |
| D639,295 | S | 6/2011 | Andre et al. | D14/318 |
| D708,179 | S | 7/2014 | Andre et al. | |
| D723,539 | S | 3/2015 | Andre et al. | |
| D774,505 | S * | 12/2016 | Akana | D14/318 |
| D776,107 | S * | 1/2017 | Akana | D14/318 |
| D776,653 | S * | 1/2017 | Akana | D14/318 |
| D787,500 | S * | 5/2017 | Akana | D14/315 |
| D803,825 | S * | 11/2017 | Akana | D14/315 |
| D806,700 | S * | 1/2018 | Akana | D14/315 |
| D806,701 | S * | 1/2018 | Akana | D14/315 |
| D812,604 | S * | 3/2018 | Akana | D14/315 |
| D813,224 | S * | 3/2018 | Akana | D14/315 |
| D813,225 | S * | 3/2018 | Akana | D14/315 |
| D813,226 | S * | 3/2018 | Akana | D14/315 |
| D816,661 | S * | 5/2018 | Akana | D14/315 |
| D819,017 | S * | 5/2018 | Akana | D14/318 |
| 2005/0018396 | A1 | 1/2005 | Nakajima et al. | G06F 1/1616 361/679.08 |
| 2005/0041378 | A1 | 2/2005 | Hamada et al. | G06F 1/1616 361/679.01 |
| 2012/0099264 | A1 * | 4/2012 | Degner et al. | G06F 1/1616 361/679.09 |
| 2013/0329359 | A1 * | 12/2013 | Andre et al. | G06F 1/1616 361/679.55 |

OTHER PUBLICATIONS

Apple PowerBook G4 Aluminum, available at least as early as Jan. 1, 2003.
Apple MacBook Pro, available at least as early as Jan. 10, 2006.
Apple MacBook Air, available Jan. 15, 2008, http://images.apple.com/macbookair/images/design_gal01_20080115.jpg.
Apple MacBook Air, available Jan. 15, 2008, http://images.apple.com/macbookair/images/design_gal02_20080115.jpg.
Apple MacBook Air, available Jan. 15, 2008, http://images.apple.com/macbookair/images/design_gal03_20080115.jpg.
Apple MacBook Air, available Jan. 15, 2008, http://images.apple.com/macbookair/images/design_gal04_20080115.jpg.
Apple MacBook Air, available Jan. 15, 2008, http://images.apple.com/macbookair/images/design_thinair20080115.
Apple MacBook Air, available Jan. 15, 2008, http://images.apple.com/macbookair/images/design_displayair20080115.jpg.
Apple MacBook Air, available Jan. 15, 2008, http://images.apple.com/macbookair/images/design_keyboardair20080115.jpg.
Apple MacBook Air, available Jan. 15, 2008, http://images.apple.com/macbookair/images/design_gal08_20080115.jpg.
U.S. Appl. No. 29/459,366 of Bartley K. Andre et al. filed Jun. 28, 2013.
U.S. Appl. No. 29/459,559 of Bartley K. Andre et al. filed Jul. 1, 2013.

* cited by examiner

*(CANCELLED)*

(CANCELLED)

(CANCELLED)

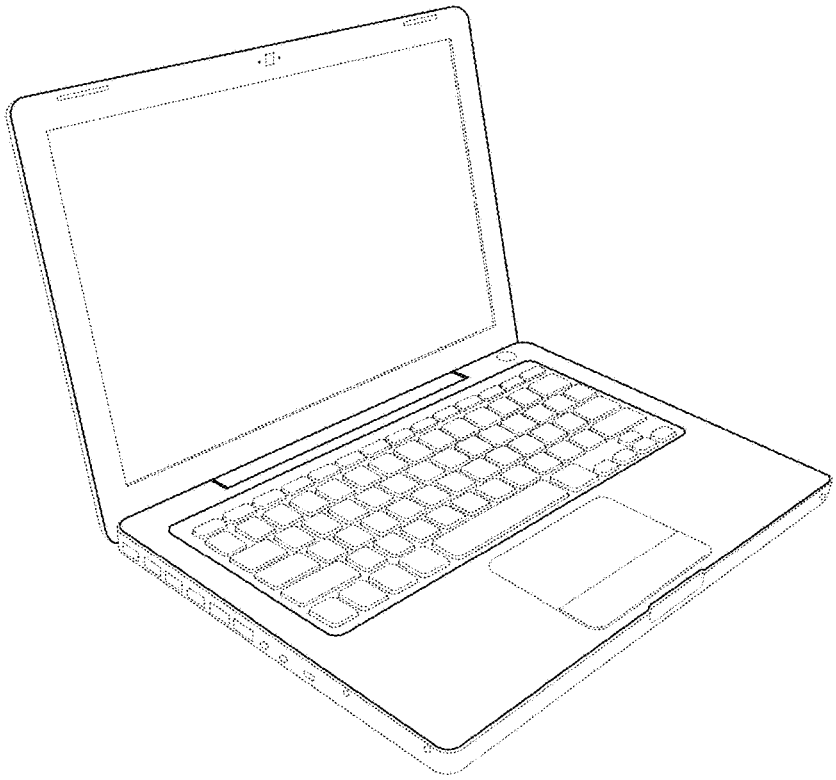
*Fig. 4*
*(NEW)*

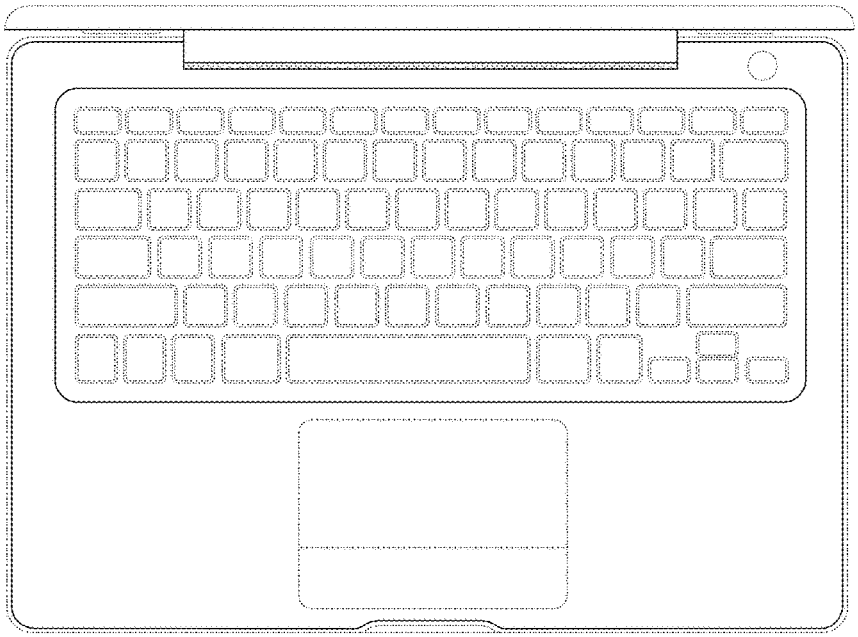
*Fig. 5*
*(NEW)*

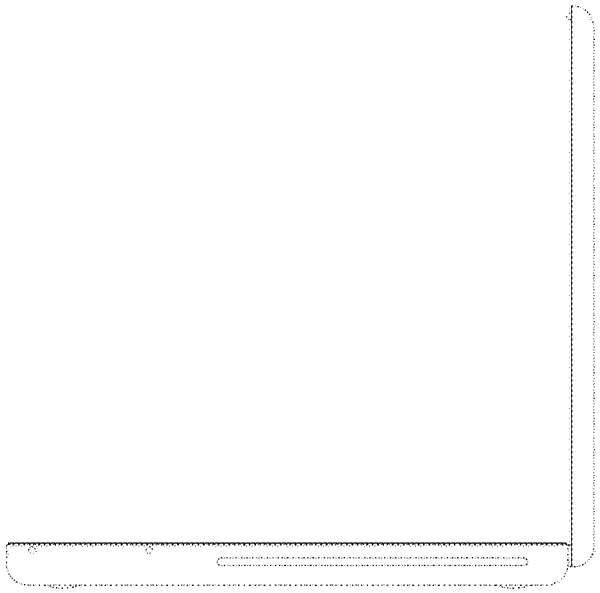
*Fig. 6*
*(NEW)*

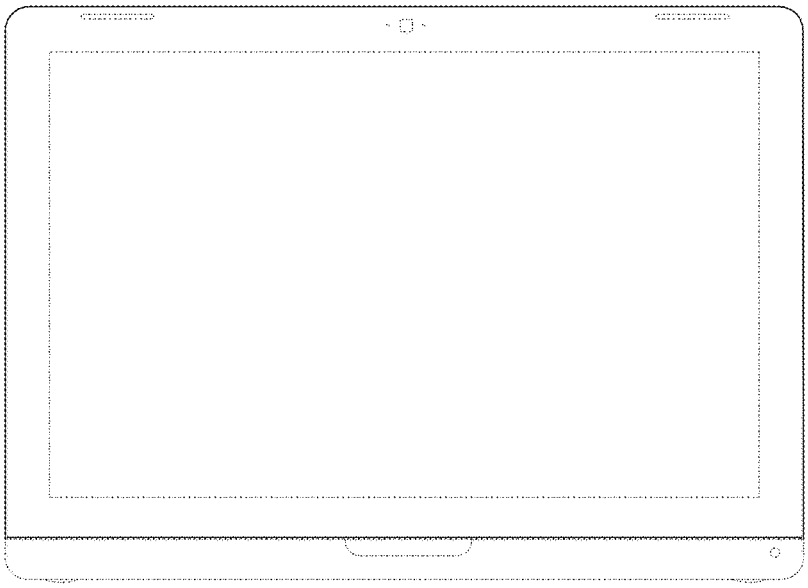
*Fig. 7*
*(NEW)*

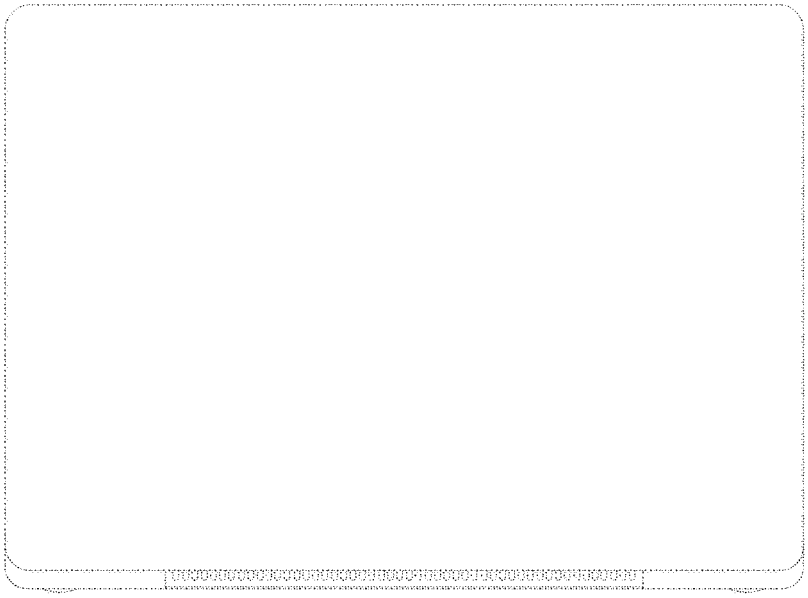
*Fig. 8*
*(NEW)*